United States Patent
Miao et al.

(10) Patent No.: US 8,761,288 B2
(45) Date of Patent: Jun. 24, 2014

(54) LIMITED CHANNEL INFORMATION FEEDBACK ERROR-FREE CHANNEL VECTOR QUANTIZATION SCHEME FOR PRECODING MU-MIMO

(75) Inventors: Wei Miao, Beijing (CN); Min Huang, Beijing (CN); Shindong Zhou, Beijing (CN); Gang Wu, Shanghai (CN)

(73) Assignee: NXP, B.V., Eindhoven (NL)

(*) Notice: Subject to any disclaimer, the term of this patent is extended or adjusted under 35 U.S.C. 154(b) by 614 days.

(21) Appl. No.: 12/919,374

(22) PCT Filed: Feb. 26, 2009

(86) PCT No.: PCT/IB2009/050785
§ 371 (c)(1),
(2), (4) Date: Mar. 7, 2011

(87) PCT Pub. No.: WO2009/107090
PCT Pub. Date: Sep. 3, 2009

(65) Prior Publication Data
US 2011/0150114 A1    Jun. 23, 2011

Related U.S. Application Data

(60) Provisional application No. 61/031,566, filed on Feb. 26, 2008.

(51) Int. Cl.
*H04L 1/02* (2006.01)
*H04B 7/04* (2006.01)
*H04L 1/00* (2006.01)

(52) U.S. Cl.
CPC .......... *H04B 7/0417* (2013.01); *H04L 1/0003* (2013.01); *H04L 1/0009* (2013.01); *H04B 7/0465* (2013.01)
USPC .......... 375/267; 375/259; 375/260; 375/270; 375/295; 375/316

(58) Field of Classification Search
CPC ............. H04B 7/0417; H04B 17/0067; H04B 7/0632; H04B 7/0673; H04B 7/0452; H04B 7/0626; H04B 7/0465; H04B 7/0469; H04B 7/0486; H04B 7/063; H04B 7/065; H04B 7/024; H04B 7/0639; H04L 1/0026
USPC .......... 375/219, 224, 259, 260, 262, 264, 267, 375/268, 271, 295, 299, 302, 306, 316, 320, 375/321, 328, 340, 342, 346, 350
See application file for complete search history.

(56) References Cited

U.S. PATENT DOCUMENTS 8,234,546 B2 * 7/2012 Mielczarek et al. .......... 714/774
8,422,393 B2 * 4/2013 Roh et al. ...................... 370/252

(Continued)

FOREIGN PATENT DOCUMENTS

| EP | 06004505.1 | 3/2006 | |
|---|---|---|---|
| WO | WO 2007062580 A1 * | 6/2007 | ................ H04L 1/00 |
| WO | 2007114654 | 10/2007 | |

OTHER PUBLICATIONS

Jindal, Nihar; "A Feedback Reduction Technique for MIMO Broadcast Channels"; ISIT 2006, Seattle, WA, US; (Jul. 9-14, 20086.

(Continued)

*Primary Examiner* — Hirdepal Singh

(57) ABSTRACT

A multiuser downlink multiple-input multiple-output (MIMO) system with limited channel information feedback includes an error-free channel vector quantization scheme. Each user has multiple antennas, and the base station includes a matching number of antennas. Each MIMO channel is measured at the terminus end of a corresponding user, and used to obtain the channel state information at the receiver (CSIR). A few data bits of CSIR information are feed back to the base station through the limited feedback channels. The base station collects all these CSIR feedback data bits into a CSI at the transmitter (CSIT). The CSIT is used to determine which users are served, and how to configure a corresponding multi-user precoder. The user data channels will later all be transmitted through such precoder. A codebook of channel quantization vectors is pre-defined and distributed amongst the base station and all the users.

12 Claims, 2 Drawing Sheets

(56) References Cited

U.S. PATENT DOCUMENTS

| | | | | |
|---|---|---|---|---|
| 8,503,565 | B2* | 8/2013 | Lee et al. | 375/267 |
| 8,571,086 | B2* | 10/2013 | Forenza et al. | 375/141 |
| 2007/0049218 | A1 | 3/2007 | Gorokhov et al. | |
| 2007/0098106 | A1* | 5/2007 | Khojastepour et al. | 375/267 |
| 2007/0211823 | A1* | 9/2007 | Mazzarese et al. | 375/299 |
| 2008/0181285 | A1* | 7/2008 | Hwang et al. | 375/148 |
| 2008/0310542 | A1* | 12/2008 | Gao et al. | 375/267 |
| 2009/0201861 | A1* | 8/2009 | Kotecha | 370/329 |
| 2011/0080964 | A1* | 4/2011 | Shamsi et al. | 375/260 |
| 2012/0275534 | A1* | 11/2012 | Mielczarek et al. | 375/267 |
| 2012/0307929 | A1* | 12/2012 | Seo et al. | 375/267 |

OTHER PUBLICATIONS

Jindal, Nihar; "Antenna Combining for the MIMO Downlink Channel"; 16 Pages (Aug. 2007).

Kountouris, Marios, et al; "Multiuser Diversity—Multiplexing Tradeoff in MIMO Broadcast Channels With Limited Feedback"; 5 Pages, Oct. 29-Nov. 1, 2006.

Philips; "System-Level Simulation Results for Channel Vector Quantisation Feedback for MU-MIMO"; 3GPP TSG RAN WG1 Meeting #47; Riga, Latvia; (Nov. 6-10, 2006).

Samsung; "Further Performance Comparison of Unitary Vs. Non-Unitary Precoding"; 3GPP TSG RAN WG1 Meeting #46 BIS; Seoul, Korea; 5 Pages (Oct. 9-13, 2006).

Boccardi, Federico, et al; "MIMO Multiuser Schemes for Downlink Transmissions: Theoretic Bounds and Practical Techniques"; Paris, FR; 33 Pages; (Mar. 29, 2007).

Kim, Jee Hyun, et al; "Efficient Feedback Via Subpace Based Channel Quantization for Downlink Transmission in Distributed Cooperative Antenna Systems"; 7 Pages (2007).

Zakhour, Randa, et al; "A New Approach to Exploiting Limited Feedback in Multi-User MIMO Channels"; Mobile Communications Dept Seminar, EURECOM Institute; 22 Pages (Sep. 27, 2007).

Ekpenyong, Anthony E., et al; "Feedback Constraints for Adaptive Transmission—Draft" 20 Pages; (Jan. 26, 2007).

Telatar, I. Emre; "Capacity of Multi-Antenna Gaussian Channels"; European Transactions on Telecommunications, vol. 10, No. 6 ; 28 Pages (Nov./Dec. 1999).

Goldsmith, Andrea, et al; "Capacity Limits of MIMO Channels"; IEEE Journal on Selected Areas in Communications, vol. 21, No. 5; pp. 684-702 (Jun. 2003).

Vishwanath, Sriram, et al; "Duality Achievable Rates, and Sum-Rate Capacity of Gaussian MIMO Broadcast Channels"; IEEE Transactions Information Theory, vol. 9, No. 10; pp. 2658-2668 (Oct. 2003).

Philips; "Comparison Between MU-MIMO Codebook-Based Channel Reporting Techniques for LTE Downlink"; 3 GPP TSG RAN WG1 Meeting #46BIS; Seoul, South Korea (Oct. 9-13, 2006).

International Search Report for Application Provided for PCT/IB2009/050785 (Feb. 26, 2007).

* cited by examiner

LIMITED CHANNEL INFORMATION FEEDBACK ERROR-FREE CHANNEL VECTOR QUANTIZATION SCHEME FOR PRECODING MU-MIMO

The present invention relates generally to multiple-input multiple-output (MIMO) communication systems, and more particularly to limited-feedback methods for multi-user (MU) downlink MIMO communication systems.

Next-generation wireless communication systems need high spectrum efficiency and large system capacity to support modern, high data rate services. Multiple-input multiple-output (MIMO) wireless communication systems with MIMO antennas have great potential in such applications. MIMO channel capacities increase in proportion to the numbers of transmit and receive antennas used in rich scattering environments. In multiuser downlinks, the separation of receivers disables the joint receive processing among them, so multiuser interference suppression is relocated to the transmitter by joint transmit processing, e.g., space precoding.

It is impractical to use full channel state information (CSI) at the transmitter in frequency-division duplex (FDD) or time-division duplex (TDD) communication systems. The feedback channel capacity is limited, so only a partial CSI at the transmitter can be used.

Recently, multiuser diversity has been looked at for high data throughput in multiuser communications. In MIMO systems, the small-scale channel variations of different users provide methods to select the users with the best channel capacities. Combining the finite rate feedback and user selection diversity, a per-user unitary rate control (PU2RC) with feedback and beamforming was adopted as the multiuser MIMO scheme. In this scheme, the management of the precoding vectors is limited in a unitary matrix. A non-unitary precoding scheme is proposed in which each user quantizes its channel using a channel vector quantization method and feeds back the index and the estimated CQI to the BS. The BS schedules the users and applies a zero-forcing precoder for the selected users. Some simulation results show better performance than the PU2RC.

A vector quantizer maps k-dimensional vectors in the vector space $R^k$ into a finite set of vectors $Y = \{y_i: i = 1, 2, \ldots, N\}$. Each vector $y_i$ is called a code vector or a codeword, and a set of all the codewords is called a codebook.

One conventional channel vector quantization method is only applied in cases where each user in a system has only one antenna. The resulting vector quantization error degrades the system performance. And, the number of the spatial data streams for each user is confined to one at most.

For example, in a MU-MIMO downlink channel, with M antennas at the Node B, and K single antenna users, the channel of user k, $k=1, \ldots, K$ is denoted as a M dimensional row vector $h_k$. Let $\tilde{h}_k = h_k/\|h_k\|$ be the unit norm channel vector of user k, normalized by its norm. Each user selects a quantization vector, $\hat{h}_k$, from a codebook of unit-norm column vectors of size $N = 2^B$: $C = \{w_1, \ldots, w_N\}$, according to the minimum Euclidean distance criterion, such that, $\hat{h}_k = w_n^T$, $$n = \arg\max_{i=1,\ldots,N} |w_i^H \tilde{h}_k^T|.$$

The codebook C is designed off-line, and is the same for all the users. It is known to the base station transmitter and every user. Each user terminal feeds back the index n to the base station transmitter, using B number of data bits per user terminal. Multi-antenna methods exploit radio channel properties to realize performance improvements. Multi-antenna spatial processing methods can be based on array, diversity, spatial multiplexing, and interference suppression gains. But, there are trade-offs among each of these types of gains that need to be considered. Each requires specialized transmitter and/or receiver processing, and any link gains will depend on the radio channel properties and the "channel knowledge" available at the receiver and transmitter.

Channel knowledge is typically described with channel state information (CSI), or a channel quality indicator (CQI). CSI is the complex valued radio channel knowledge, including the link of interest and other interfering links, e.g., a quantized version of the instantaneous realization, and its second order statistics, or main directions. CQI is a real value measure of the quality of a channel, e.g., the signal-to-interference noise ratio (SINR) after receiver processing that can be used to adapt the code rate, modulation order, and spreading at the transmitter. CSI multi-antenna techniques can be used to steer transmission direction. CQI can be used for scheduling and link adaptation, and the control of spreading in space, time, and frequency.

How much channel knowledge is available usually determines which spatial processing methods will work best.

Coherent combinations of multiple transmitter and/or receiver antennas can produce an array or beamforming gain that will increase the average SINR at the receiver. Accurate CSI algorithms are needed to extract array gain. Alternatively, the number of user terminals active during traffic slot-1 could be reduced.

Diversity can mitigate radio channel fading by reducing received signal power variability. Diversity provides multiple replicas of the data to the receiver. How much each of these replicas independently fade will represent the diversity gain. Diversity gains can be achieved with spatial processing, multiple antennas with different polarizations, and with multipath or time diversity, e.g., using frequency or time selectivity.

Receive antenna diversity in a single-in, multiple-out (SIMO) system can be extracted by combining signals from several receive antennas so that the resulting signal exhibits considerably reduced amplitude variability, compared to a single-receive antenna system. Similarly, transmit diversity can be applied to multiple-in, single-out (MISO) systems independent of transmitter CSI.

Space-time (ST) coding codes data across many transmit antennas. MIMO system Diversity is a combination of receive and transmit diversity. In frequency flat channels, the maximum achievable diversity gain is the product of the number of transmit antennas, and the number of receive antennas. The maximum diversity gain can be realized when a correlation matrix of a vectorized channel has full rank, e.g., when the channel coefficients between each transmit-receive antenna pair fade independently. But, only a limited amount of channel capacity can be used in transmit diversity applications.

Conventional multi-antenna methods include beamforming techniques that use multiple antennas to focus and steer beams in certain spatial directions to leverage array and interference rejection gains. In a single-link case, the transmitter and/or receiver adapts its antenna weights according to the channel knowledge to provide array gain. In a multi-user case, the beamforming provides spatial selectivity by allocating different antenna weights to different users for SDMA, interference rejection, and multi-user diversity gains.

Diversity techniques can increase link reliability, but at the expense of transmission rates.

In receive diversity, a receiver equipped with multiple antennas receives multiple copies of the transmitted signals and sums up a weighting output from each receive antenna to increase reliability. The optimum weights to use will maximize the output SINR, and depend on an instantaneous fading state known to the receiver, or on a receiver correlation matrix when the receiver only has statistical channel information. The maximum ratio combining (MRC) is optimal for spatially white noise plus interference, and MMSE combining for the spatially colored case.

For transmit diversity, a transmitter equipped with multiple antennas can achieve transmit diversity by spreading the transmitted symbols over time and space (ST coding). A classical theory of space-time coding specifies the so-called rank and determinant criteria to construct ST codes. The amount of transmit diversity is equal to the smallest rank of codeword-difference matrices, and the coding gain is related to the product of the non-zero singular values of these matrices. The specific design and implementation of the spreading depends on the level of channel knowledge at the transmitter and receiver.

A multi-user downlink multiple-input multiple-output (MIMO) system with limited channel information feedback includes an error-free channel vector quantization scheme. Each user has multiple antennas, and the base station includes a matching number of antennas. Each MIMO channel is measured at the terminus end of a corresponding user, and used to obtain the channel state information at the receiver (CSIR). A few data bits of CSIR information are feed back to the base station through limited feedback channels. The base station collects all these CSIR feedback data bits into a CSI at the transmitter (CSIT). The CSIT is used to determine which users are served, and how to configure a corresponding multi-user precoder. The user data channels will later all be transmitted through such precoder. A codebook of channel quantization vectors is pre-defined and distributed amongst the base station and all the users.

The channel vector quantization error can be completely eliminated and thus the system performance is significantly improved.

Each user can be allocated multiple spatial data streams by utilizing multiple antennas at each user, and the multiple channel quantization results fed back to the base station.

Other aspects and advantages of the present invention will become apparent from the following detailed description, taken in conjunction with the accompanying drawings, illustrating by way of example the principles of the invention.

Throughout the description, similar reference numbers may be used to identify similar elements.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

A generalized error-free channel vector quantization scheme works with limited channel information feedback in a multi-user MIMO downlink.

Figure 1:
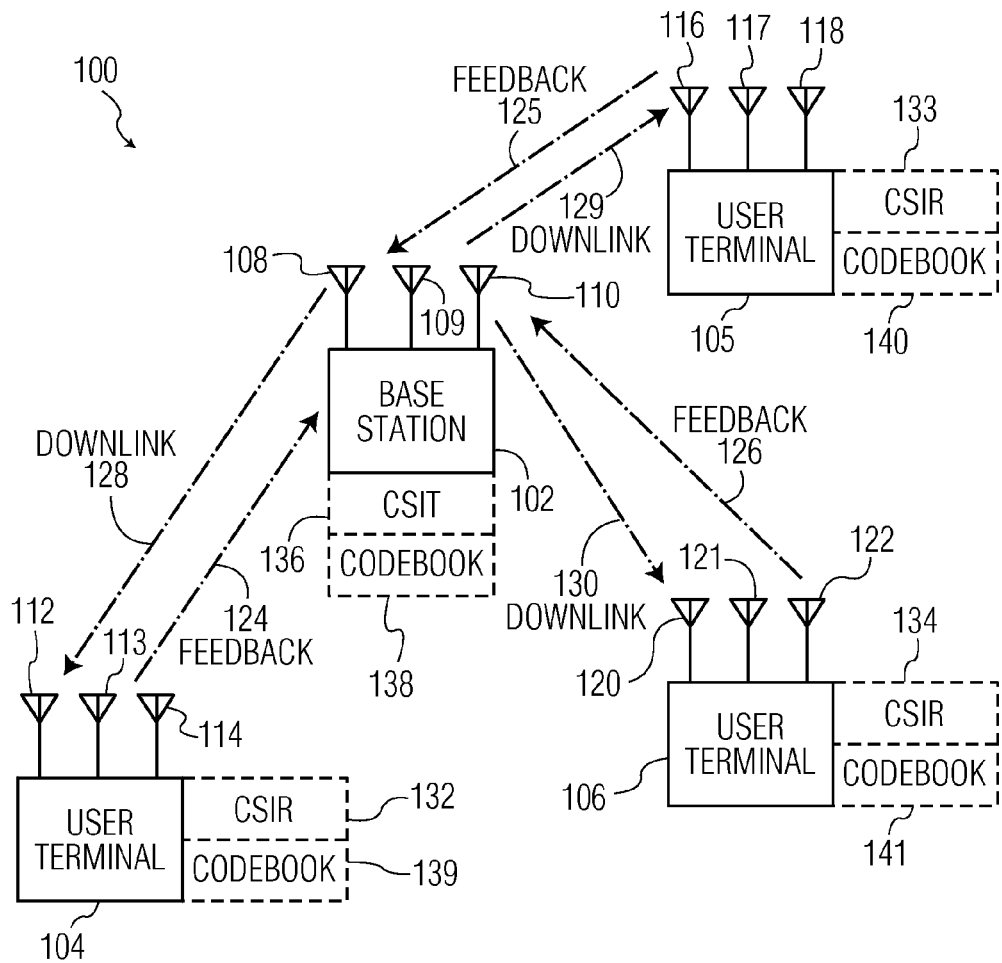
FIG. 1 is a functional block diagram of a MU-MIMO system with limited feedback channels in an embodiment of the present invention.

FIG. 1 represents a multi-user multiple-input multiple-output (MIMO) communication system 100 with a fixed central base station 102 and a plurality of independent mobile user terminals (UE's) 104-106 distributed within wireless range of the base station. The base station and each of the UE's are equipped with an equal number of multiple antennas, e.g., three base station antennas 108-110, and three each user antennas 112-114, 116-118, and 120-122. The base station obtains channel information for each user through limited feedback channels 124-126, and uses the information for multi-user precoding. A channel vector quantization and feedback scheme is provided that has no quantization error, even though the feedback data bits are limited.

Any number of antennas more than one can be used, but whatever number is used, they should all use that number of antennas. Multiple antennas are not used to support multiple spatial streams, nor are they used to provide higher diversity order, but rather they serve to help eliminate any vector quantization error. Although the number of receive antennas 112-114, 116-118, and 120-122, for each user must equal to the number of the transmit antennas 108-110 used by the base station 102, which is reasonable in practical applications such as Third Generation Partnership Project (3GPP) long-term evolution (LTE), IEEE-Standard 802.16m, and other practical applications.

MIMO channel downlinks 128-130 are measured at the corresponding users, and corresponding channel state information at each user receiver (CSIR) 132-134 is obtained. CSIR's 132-134 are processed by each user 104-106 to feedback information to the base station 102 through the limited feedback channels 124-126. The base station 102 collects these into user channel state information (CSIT) 136. The base station uses the CSIT 136 to determine which users 104-106 are being served, and builds a corresponding multi-user precoder through which the user signals are transmitted.

A codebook 138-141 of channel quantization vectors is pre-defined, and known by the base station and all the users. The size of the codebook corresponds to how many feedback data bits for each user have been collected.

Figure 2:
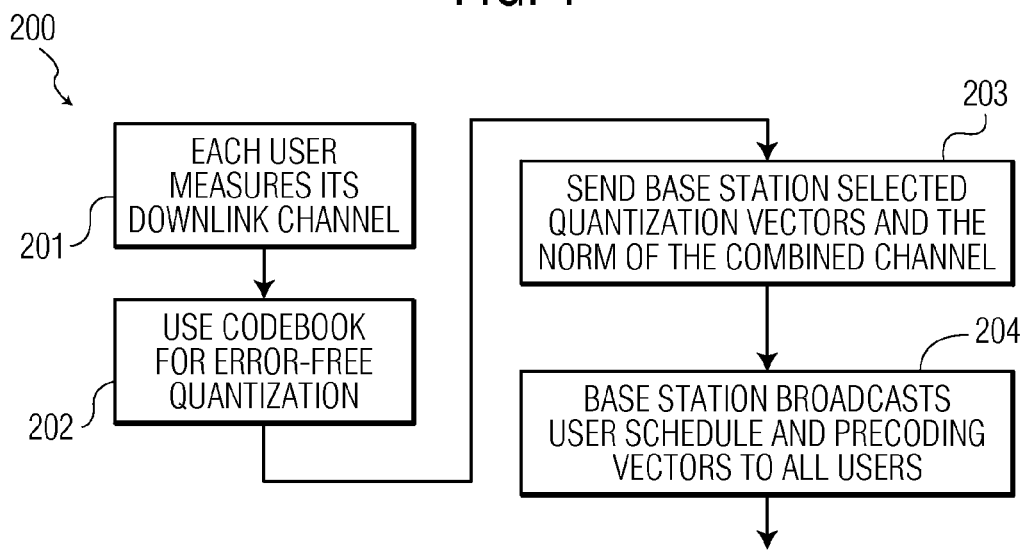
FIG. 2 is a flowchart diagram of a method used in a multiuser MIMO system with limited feedback channels.

In one method 200 diagrammed in FIG. 2, each user 104-106 measures their own corresponding downlink channel 128-130, block 201. Then, in a block 202, each user makes an error-free quantization of their channel using the respective quantization codebook 139-141. At block 203, an index of the selected quantization vector and the norm of the combined channel can then be fed back to base station 102. The scheduling and precoding can be arbitrary.

Then, at block 204, the base station 102 determines the users being served, the precoding vectors to be applied, and the adaptive modulation and coding (AMC) modes, according to feedback information from all the users. The base station then broadcasts a user schedule and precoding vectors to all the users, or uses dedicated precoded pilot symbols so the users can acquire the precoding vectors. Once the precoding is initialized, regular transmissions can commence.

The vector quantization error can be completely eliminated by linearly combining the channel vectors corresponding to each user receive antenna. Conventional channel vector quantization methods typically apply to single antenna user cases, where there is always an error between the chosen quantization vector and the actual channel vector due to the limited size of the quantization vector codebook.

The method 200 uses the multiple receive antennas to create a combined virtual channel vector. By carefully designing the combination coefficients, the angle between the virtual channel vector and the quantization vector in the codebook can be zeroed, and that will zero the vector quantization error. The system sum-rate is thereby increased dramatically, and the system's flexibility is greatly improved.

The only quantization error occurs when quantizing the norm of the combined virtual channel vector, which is a scalar quantization, so the quantization error can be negligible when using moderate quantization data bits.

At block 202, the number of quantization results is not limited to one for each user. Every user can feedback several quantization vectors to the base station, and allow the base station to select amongst them. At most, those with the same number of receive antennas in the transmission. This implies that each user can support multiple subchannels.

Method 200 further includes selecting and applying optimal channel quantization vectors derived from a pre-defined vector quantization codebook.

Figure 3:
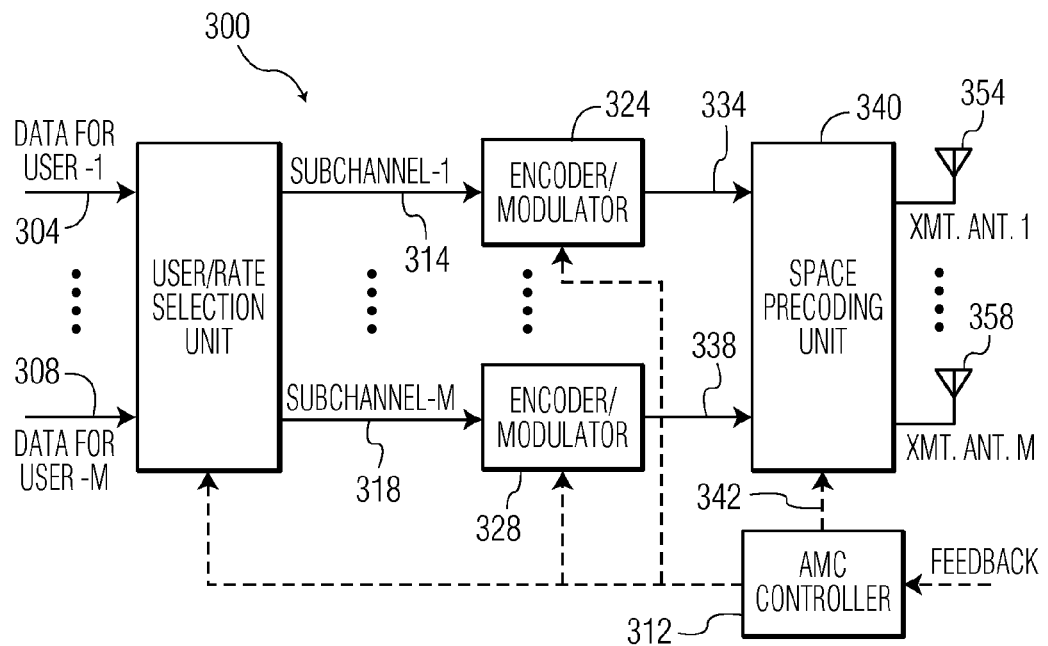
FIG. 3 is a functional block diagram of a transmitter in a multiuser MIMO system with limited feedback channels.

FIG. 3 represents a transmitter 300 of a multi-user MIMO system, such as system 100. Transmitter 300 includes a user/rate selection unit 302 for selecting to which users incoming data 304-308 should be transmitted, and sets the respective data rates of each user. The selection is based on adaptive modulation and coding (AMC) instructions 310 provided by an AMC controller 312. The AMC instructions 310 are derived from feedback information, e.g., CSIR 132-134, returned by the individual users.

The user/rate selection unit 302 outputs data 314-318 in parallel to corresponding encoder/modulator units 324-328. Each encoder/modulator unit encodes and modulates its corresponding data. The encoded/modulated signal output results 334-338 are forwarded to a space precoding unit 340. The space precoding unit 340 transforms the encoded/modulated signals according to an AMC instruction 342, and transformed signals are transmitted through corresponding space directions, e.g., by weighted transmit antennas 354-358.

Figure 4:
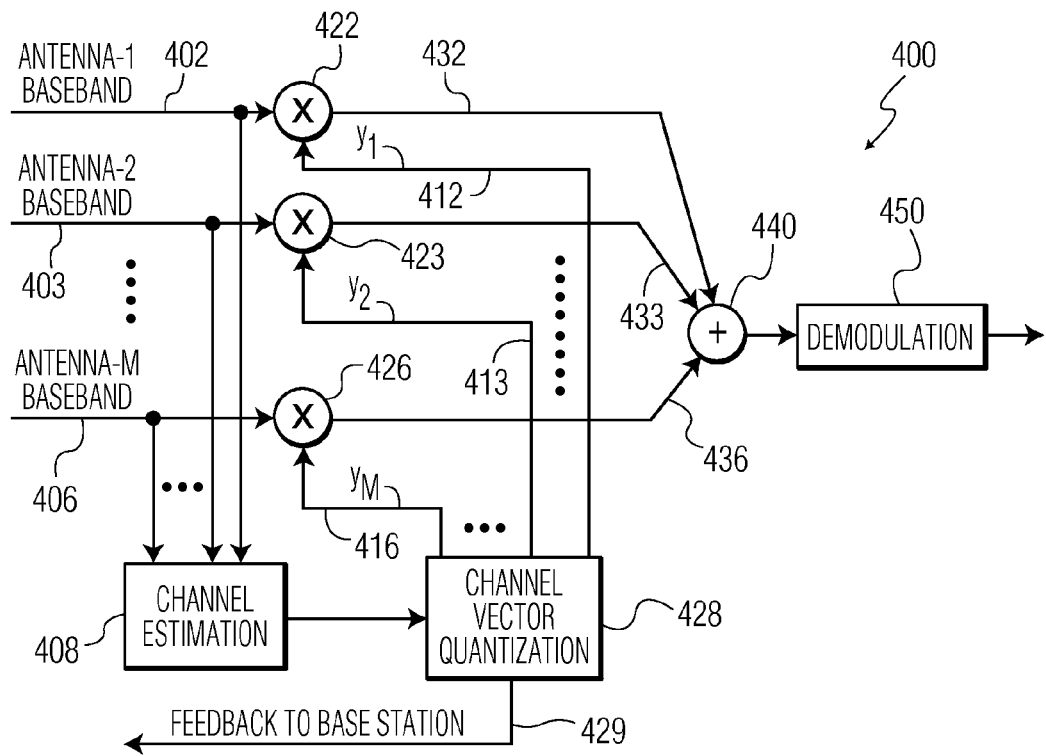
FIG. 4 is a functional block diagram of a receiver in a multiuser MIMO system with limited feedback channels.

FIG. 4 represents a receiver 400 in a multi-user MIMO system, such as system 100. After RF amplification and down conversion in previous stages, baseband signals 402-406 are sampled by a channel estimation unit 408 and adjusted with channel vector quantization 412-416 in mixers 422-426 from a channel vector quantization unit 428. A feedback 429 is returned to the base station. The results 432-436 for each antenna are added together in a summer 440 and provided to a demodulator 450.

For each downlink of a wireless communication system with multiple transmit antennas at a base station, and multiple receive antennas for each of K number of users, it is assumed in one example, that base station has M number of transmit antennas and user k, k=1, . . . , K has M number of receive antennas. The channel can be modeled as a frequency-flat, block fading, and additive white Gaussian noise channel. The interference from neighboring cells can be modeled as an additive Gaussian noise, e.g., to concentrate on a single cell.

The channel output of a receiver k is an M×1 column vector, $y_k = H_k x + n_k$, where x is the transmit signal of the base station, and is constrained to have power no greater than a sum-power constraint P, e.g., $tr(E(xx^H)) \leq P$.

The M×1 vector, $n_k$, represents the additive noise. The channel $H_k$ is an M×M complex matrix, each row of which denotes the channel vector between the base station and one receive antenna of user k.

The method includes an optimization problem of projecting a vector onto the column space of a matrix. The rows of $H_k$ are assumed to be linearly independent, due to the randomness of the elements of matrix $H_k$. The space spanned by the rows of $H_k$ is the M dimensional complex Euclidean space.

Each code vector in the channel vector quantization codebook $C = \{w_1, \ldots, w_N\}$ is in the column space of $H_k^T$, that is to say, $w_n$, represented as the linear combination of the column vectors of $H_k^T$, as follows, $$H_k^T v_n = w_n$$

Then the weighting coefficient vector v can be calculated as, $$v_n = (H_k^T)^{-1} w_n$$

Let $\gamma_n = \dfrac{v_n}{\|v_n\|}$, then $\|\gamma_n\| = 1$.

The received signal vector is $y_k = H_k x + n_k$. Taking $\gamma_n^T$ as the receive weighting coefficient, $$\begin{aligned} y_{k,n}^{comb} &= \gamma_n^T y_k \\ &= \gamma_n^T (H_k x + n_k) \\ &= \dfrac{v_n^T}{\|v_n\|} H_k x + \gamma_n^T n_k \\ &= \dfrac{w_n^T}{\|v_n\|} x + \gamma_n^T n_k \\ &= h_{k,n}^{vir} x + \gamma_n^T n_k \end{aligned}$$

where, $$h_{k,n}^{vir} = \dfrac{w_n^T}{\|v_n\|} = \gamma_n^T H_k$$

is the virtual channel vector of user k.

The channel matrix of each user is transferred to a M dimensional row vector, which is composed of the vector quantization vector in the codebook, and a scalar so only a few data bits are needed to represent it. There is no vector quantization error. In managing the channel quantization vectors at each user, the number of the selected quantization vectors for each user can be more than one. More than one quantization result can be fed back to provide multiple streams for each user, and thereby provide more user scheduling choices for the base station.

The preferred quantization vectors are successively determined. The posterior ones should correlate with the anterior ones. Assuming a user k can feedback $L_k (L_k \leq M)$ indices of code vector, the virtual channel vectors, $\{h_{k,n}^{vir}\}_{n=1}^{2^B}$ are calculated for all the code vectors. Then the one that has the largest Euclidean norm, $h_{k,(1)}^{vir}$, is chosen. The index and the corresponding norm are fed back. All the remaining $h_{k,n}^{vir}$ are projected into the orthogonal subspace of the subspace spanned by $h_{k,(1)}^{vir}$. The projection with the largest Euclidean norm, $h_{k,(2)}^{vir}$, is chosen. The index and the corresponding norm of virtual channel vector are fed back. All the remaining $h_{k,n}^{vir}$ are projected into the orthogonal subspace of the subspace spanned by $h_{k,(1)}^{vir}$ and $h_{k,(2)}^{vir}$. The one projection with the largest Euclidean norm, $h_{k,(3)}^{vir}$, is chosen. The index and the corresponding norm of virtual channel vector is fed back. The remaining quantization vectors are determined by parity of reasoning.

A detailed description of the algorithm for the management of $L_k$ quantization vectors, at user k, is presented in Table-I.

TABLE-I

The management of $L_k$ quantization vectors at user k, $L_k \leq M$ (Step 1) Calculate virtual channel vector:
For $n = 1, 2, \ldots, 2^B$:
$$v_n = (H_k^T)^{-1} w_n$$
$$\gamma_n = \frac{v_n}{\|v_n\|}$$
$$h_{k,n}^{vir} = \frac{w_n^T}{\|v_n\|} = \gamma_n^T H_k$$

(Step 2) Initialization:
$T = \{1, 2, \ldots, 2^B\}$
$i = 1$
$S = \phi$ (Step 3) For each element $n \in T$, calculate $g_n$, the component of $h_{k,n}^{vir}$ orthogonal to the subspace spanned by $\{g_{(1)}, \ldots, g_{(i-1)}\}$:
$$g_n = h_{k,n}^{vir}\left(I - \sum_{j=1}^{i-1} \frac{g_{(j)}^H g_{(j)}}{\|g_{(j)}\|^2}\right)$$

(Step 4) Select the i th quantization vector as follows:
$$\pi(i) = \arg\max_{n \in T} \|g_n\|$$
$S \leftarrow S \cup \{\pi(i)\}$
$T \leftarrow T \setminus \{\pi(i)\}$
$h_{k,(i)}^{eff} = h_{k\pi(i)}^{eff}$
$g_{(i)} = g_{\pi(i)}$ (Step 5) If $|S| < L_k$, $i \leftarrow i + 1$, go to step 3).
(Step 6) Feed back the $L_k$ indices and the corresponding norms of virtual channel vectors to the base station.

The method above was compared in simulations with per-user unitary rate control (PU2RC) under a frequency-division duplex long-term evolution (FDD-LTE) system. The applied vector quantization codebook was a set of Fourier vectors, $$w_n = \frac{1}{\sqrt{M}} \cdot [1 \quad e^{-j2\pi\alpha_n} \quad \ldots \quad e^{-j2\pi(M-1)\alpha_n}]^T,$$

where
$\alpha = [\alpha_1 \, \alpha_2 \, \ldots \, \alpha_N]$ is the group of the parameters, corresponding to the $N = 2^B$ Fourier vectors, where $$\alpha_l = \frac{n-1}{N},$$

n=1~N

In the simulations, the base station applied zero-forcing beamforming with equal power allocation (ZFEP) and used a sum rate greedy scheduling algorithm to select served users. When a single user returned multiple feedback indices, the base station regarded them as being returned from multiple users.

In PU2RC, each user feeds back the index of the preferred unitary matrix and the CQI values corresponding to the precoding vectors within the unitary matrix. From the simulations run with a 2*2 antenna configuration, zero-forcing precoding in combination with a quantization error-free limited feedback scheme (ZF-QEF) outperformed PU2RC in most cases. The performance of ZF-QEF was slightly worse than that of PU2RC in the low SNR. For a 4*4 antenna configuration with five active users in the system, PU2RC outperformed ZF-QEF. This is because the multi-user diversity gain cannot be well exploited by ZF-QEF with too few users.

When the number of active users in the system increases, ZF-QEF outperformed PU2RC in the high SNR regime.

However, the performance of ZF-QEF was still inferior to PU2RC in the low SNR regime.

The inferior performance of ZF-QEF under low SNR was due to the zero-interference characteristic of the ZF precoding scheme not taking into account the effects of noise.

Although specific embodiments of the invention have been described and illustrated, the invention is not to be limited to the specific forms or arrangements of parts as described and illustrated herein. The invention is limited only by the claims.

What is claimed is:

1. A method of wireless radio communication, comprising:
   at a receiver, collecting a measurement from each of its receiving antennas;
   using a codebook for error-free quantization of each said measurement;
   from the receiver, feeding back selected quantization vectors from said error-free quantization and the norm of the combined channel; and
   at the receiver, receiving a user schedule and precoding vectors;
   wherein, a generalized error-free channel vector quantization scheme is provided, the method further comprising:
   using multiple receive antennas to create a combined virtual channel vector; and
   computing combination coefficients such that an angle between a virtual channel vector and a quantization vector in the codebook will be zero, and a vector quantization error will be zero;
   wherein the quantization error that occurs when quantizing the norm of a combined virtual channel vector is negligible.

2. The method of claim 1, further comprising:
   limiting channel information feedback for a multi-user multi-input, multi-output (MIMO) downlink.

3. The method of claim 1, wherein the receiver is disposed in a user terminal.

4. The method of claim 3, further comprising:
allowing the user terminal to be mobile.

5. The method of claim 1, further comprising:
not limiting the number of quantization results at the receiver to one;
wherein, a user can feed back many quantization vectors; and
wherein, the receiver can thereby support multiple subchannels.

6. A receiver, comprising:
a channel estimation unit for obtaining measurements of baseband signals provided by each of a plurality of receive antennas;
a channel vector quantization unit using a codebook for error-free quantization of each said measurement; and
the receiver, feeds back selected quantization vectors from the error-free quantization and the corresponding norm;
mixers controlled by the codebook and providing a combined output by a summer for demodulation,
wherein, a generalized error-free channel vector quantization is provided, wherein multiple receive antennas of the receiver are used to create a combined virtual channel vector, wherein combination coefficients are computed such that an angle between a virtual channel vector and a quantization vector in a codebook will be zero, and a vector quantization error will be zero, and wherein the quantization error that occurs when quantizing the norm of a combined virtual channel vector is negligible.

7. A multiuser downlink multiple-input multiple-output (MIMO) system, comprising:
a single base station with a transmitter providing for a plurality of MIMO channels to a plurality of user terminals through a plurality of antennas;
a limited feedback channel from each of said plurality of user terminals for MIMO channel information feedback comprising selected quantization vectors from error-free quantization and the norm of a combined channel to the base station;
an error-free channel vector quantization device disposed in each of said plurality of user terminals;
a MIMO channel estimation unit disposed in each of said plurality of user terminals for obtaining measurements at a terminus end of a corresponding user, and for obtaining channel state information at the receiver (CSIR);
a feedback device for sending a few data bits of CSIR information from each of said plurality of user terminals to the base station through the limited feedback channels;
a codebook device at the base station for collecting said CSIR feedback data bits into a CSI at the transmitter (CSIT), wherein said CSIT is used to determine which users are served, and how to configure a corresponding multi-user precoder;
wherein, each user terminal has multiple antennas, and the base station includes a matching number of antennas, wherein multiple receive antennas are used to create a combined virtual channel vector, wherein combination coefficients are computed such that an angle between a virtual channel vector and a quantization vector in a codebook will be zero, and a vector quantization error will be zero, and wherein the quantization error that occurs when quantizing the norm of a combined virtual channel vector is negligible.

8. The system of claim 7, further comprising:
a plurality of transmitter antennas respectively connected to respective encoded subchannels from a space precoding unit;
wherein, the number of transmitter antennas in said plurality of transmitter antennas is equal in number to a number of receiver antennas used in a plurality of receiver antennas attached to a receiver able to receive and decode at least one said encoded subchannel from said space precoding unit.

9. The system of claim 7, further comprising:
a codebook used for error-free quantization of each said measurement;
individual mixers controlled by the codebook and providing a combined output by a summer for demodulation;
wherein, a generalized error-free channel vector quantization scheme is provided.

10. The system of claim 7, further comprising:
a transmitter and receiver both disposed in the base station and providing for operation from a fixed location.

11. The system of claim 7, further comprising:
a transmitter and receiver both disposed in each user terminal and providing for mobile operation in proximity to the base station.

12. The system of claim 7, further comprising:
a summer for linearly combining at said transmitter each of the channel vectors corresponding to each receiver antenna so that a vector quantization error can be zeroed.

* * * * *